United States Patent
Yamaguchi

(10) Patent No.: US 12,404,403 B2
(45) Date of Patent: Sep. 2, 2025

(54) POLYPHENYLENE ETHER-BASED RESIN COMPOSITION AND MOLDED ARTICLE

(71) Applicant: ASAHI KASEI KABUSHIKI KAISHA, Tokyo (JP)

(72) Inventor: Toru Yamaguchi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 649 days.

(21) Appl. No.: 17/756,415

(22) PCT Filed: Nov. 24, 2020

(86) PCT No.: PCT/JP2020/043688
§ 371 (c)(1),
(2) Date: May 25, 2022

(87) PCT Pub. No.: WO2021/106879
PCT Pub. Date: Jun. 3, 2021

(65) Prior Publication Data
US 2023/0033431 A1     Feb. 2, 2023

(30) Foreign Application Priority Data
Nov. 29, 2019    (JP) ................. 2019-217294

(51) Int. Cl.
| | | |
|---|---|---|
| C08L 71/12 | (2006.01) | |
| C08K 3/00 | (2018.01) | |
| C08K 3/34 | (2006.01) | |
| C08K 5/521 | (2006.01) | |
| C08K 9/06 | (2006.01) | |
| C08L 53/02 | (2006.01) | |

(52) U.S. Cl.
CPC .............. *C08L 71/123* (2013.01); *C08K 3/00* (2013.01); *C08K 3/34* (2013.01); *C08K 5/521* (2013.01); *C08K 9/06* (2013.01); *C08L 53/02* (2013.01); *C08L 71/12* (2013.01)

(58) Field of Classification Search
CPC ........ C08L 71/123; C08L 71/12; C08L 53/02; C08K 3/00; C08K 3/34; C08K 5/521; C08K 9/06
See application file for complete search history.

(56) References Cited

U.S. PATENT DOCUMENTS

| | | | |
|---|---|---|---|
| 5,204,395 A | 4/1993 | Lupinski | |
| 6,469,077 B1 * | 10/2002 | Moritomi | ............... C08K 5/523 |
| | | | 524/145 |
| 2006/0241212 A1 | 10/2006 | Ozeki | |
| 2007/0259993 A1 | 11/2007 | Yamaguchi | |

FOREIGN PATENT DOCUMENTS

| | | |
|---|---|---|
| CN | 101679720 A | 3/2010 |
| CN | 103044894 A | 4/2013 |
| EP | 0183195 A2 | 6/1986 |
| JP | S57501966 A | 11/1982 |
| JP | 861130368 A | 6/1986 |
| JP | H05262977 A | 10/1993 |
| JP | 2000186196 A | 7/2000 |
| JP | 2005023260 A | 1/2005 |
| JP | 2006306061 A | 11/2006 |
| JP | 2011252114 A | 12/2011 |
| JP | 2019123762 A | 7/2019 |
| JP | 2020015788 A | 1/2020 |
| TW | 200948895 A1 | 12/2009 |
| WO | 8202050 A1 | 6/1982 |
| WO | 2004016692 A1 | 2/2004 |
| WO | WO-2014/192421 A1 * | 12/2014 |

OTHER PUBLICATIONS

Machine English translation of WO 2014/192421, Ohigashi, Dec. 4, 2014.*
Feb. 9, 2021, International Search Report issued in the International Patent Application No. PCT/JP2020/043688.
May 17, 2022, International Preliminary Report on Patentability issued in the International Patent Application No. PCT/JP2020/043688.

* cited by examiner

*Primary Examiner* — Patrick D Niland
(74) *Attorney, Agent, or Firm* — KENJA IP LAW PC

(57) ABSTRACT

A polyphenylene ether-based resin composition includes 25 to 84 mass % of a polyphenylene ether (A), 1 to 20 mass % of a styrene-based thermoplastic elastomer (B), 4 to 25 mass % of a flame retardant (C), and 11 to 30 mass % of a kaolin clay (D) when a total content of these four components is taken as 100 mass %. The (C) component contains, per 100 mass % of the (C) component, 0 to 97 mass % of an organophosphorus flame retardant (C-1) having a 10-mass % reduction temperature 380 to 430° C., and 100 to 3 mass % of an organophosphorus flame retardant (C-2) having a 10-mass % reduction temperature 330 to 360° C. The 10-mass % reduction temperature is determined from a heating loss curve obtained by heating about 10 mg of the (C-1) or (C-2) component from 30° C. to 800° C. at 10° C./min under a nitrogen atmosphere in a TGA measurement apparatus.

15 Claims, No Drawings

POLYPHENYLENE ETHER-BASED RESIN COMPOSITION AND MOLDED ARTICLE

TECHNICAL FIELD

The present disclosure relates to a resin composition and a molded article.

BACKGROUND

A polyphenylene ether-based resin is normally formed by blending a polyphenylene ether and a styrene-based resin in certain proportions that are dependent on the levels of heat resistance and molding fluidity that are required. The polyphenylene ether-based resin may be further blended with an elastomer component and additive components such as a flame retardant, an inorganic filler, and a heat stabilizer as necessary to thereby form the resin composition. Polyphenylene ether-based resins have excellent heat resistance, mechanical properties, molding processability, acid and alkali resistance, dimensional stability, electrical properties, and so forth, and are thus widely used in fields such as consumer electronics, office automation, office equipment, information devices, and automobiles. Some of such applications require materials having a favorable balance between the flexural modulus (rigidity) and the tensile elongation (tenacity), as well as extremely excellent mold appearance of thin molded articles, particularly as cover parts of fire detectors. As such materials, polyphenylene ether-based resin compositions prepared by blending large amounts of a kaolin clay and a styrene-based hydrogenated block copolymer into a polyphenylene ether are used.

For example, a resin composition is known in which a styrene-based thermoplastic elastomer having a functional group, an inorganic filler such as a kaolin clay surface-treated with a silane compound, and an aromatic phosphate ester-based flame retardant are blended into a polyphenylene ether (see Patent Literature (PTL) 1, for example).

Also known is a flame-retardant resin composition made from a polyphenylene ether-based resin and a formulation of an inorganic filler such as a liquid polydiorganosiloxane and a kaolin clay (see PTL 2, for example).

CITATION LIST

Patent Literature

PTL 1: WO 2004/016692 A1
PTL 2: JP H05-262977 A

SUMMARY

Technical Problem

On the other hand, it is also known that such applications often require extremely high levels of flame retardancy at the same time, and that some degree of flame retardancy can be ensured by blending a flame retardant such as an organic phosphate ester-based flame retardant.
In a resin composition in which a large amount of a kaolin clay is blended as an inorganic filler, however, the elastomer component becomes localized on the surfaces of the kaolin clay upon combustion to thereby contribute to flammability of the combustion. It is therefore difficult to ensure flame retardancy at a high level even when a flame retardant is blended.

In the case of the resin composition disclosed in PTL 1, the resin composition molded into a thick molded article has a sufficient flame retardancy. However, particularly in the case where a combustion test in accordance with UL94 is performed on thin test specimens having a thickness of 2.0 mm to 0.5 mm, the required flame retardancy level may not be ensured and sufficient flame retardancy is not always ensured in some cases because the burning time significantly varies across the test specimens.

Further, the technique disclosed in PTL 2 cannot sufficiently improve the variation in flame retardancy of thin test specimens while maintaining a favorable performance balance among the mold appearance, the rigidity, and the tenacity.

It is therefore an object of the present disclosure to provide a polyphenylene ether-based resin composition containing a kaolin clay, which can be effectively used even in a use environment in which a favorable performance balance between the rigidity and the tenacity is required, has a good mold appearance, and is excellent in flame retardancy when molded into a thin molded article.

As a result of extensive studies to solve the above problem, the present inventor and others have discovered that a polyphenylene ether-based resin composition obtained by blending an elastomer component and a kaolin clay into the polyphenylene ether-based resin composition together with a certain type of condensation type phosphate ester-based flame retardant for providing flame retardancy can have a good mold appearance and a favorable balance between the rigidity and the tenacity, as well as exhibiting an excellent flame retardancy even when molded into a thin molded article, to thereby provide the present disclosure.

Solution to Problem

Specifically, the present disclosure is as follows:
(1) A polyphenylene ether-based resin composition comprising:
a polyphenylene ether (A);
a styrene-based thermoplastic elastomer (B);
a flame retardant (C); and
a kaolin clay (D),
wherein, when a total content of the (A), (B), (C), and (D) components is taken as 100 mass %, a content of the (A) component is 25 to 84 mass %, a content of the (B) component is 1 to 20 mass %, a content of the (C) component is 4 to 25 mass %, and a content of the (D) component is 11 to 30 mass %, and
the (C) component contains, per 100 mass % of the (C) component, 0 to 97 mass % of an organophosphorus flame retardant (C-1) having a 10-mass % reduction temperature in a range of 380 to 430° C. as measured by the following measurement method, and 100 to 3 mass % of an organophosphorus flame retardant (C-2) having a 10-mass % reduction temperature in a range of 330 to 360° C. as measured by the following measurement method:
Measurement Method of the 10-Mass % Reduction Temperature of the (C-1) and (C-2) Components>
a 10-mass % reduction temperature is determined from a heating loss curve obtained by weighing out about 10 mg of the (C-1) component or (C-2) component, which is heated from 30° C. to 800° C. at a temperature rise rate of 10° C./min under a nitrogen atmosphere in a TGA measurement apparatus.

(2) The polyphenylene ether-based resin composition according to (1), wherein
the (C-1) component is Bisphenol A bisdiphenyl phosphate, and the (C-2) component is a condensation type phosphate ester-based flame retardant represented by the following chemical formula (1):

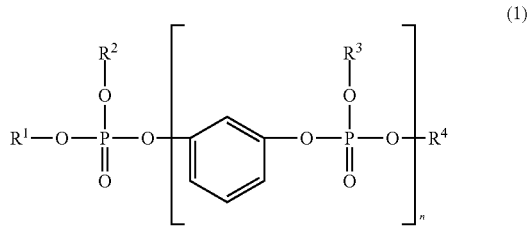

(1)

(in the formula, $R^1$ to $R^4$ are 2,6-xylyl groups, and n is 1 to 3).
(3) The polyphenylene ether-based resin composition according to (1) or (2), wherein the sum of the contents of the (A), (B), (C), and (D) components accounts for 90 mass % or more of the entire polyphenylene ether-based resin composition.
(4) The polyphenylene ether-based resin composition according to any one of (1) to (3), wherein the (B) component comprises a styrene-based thermoplastic elastomer modified with an amino compound or a carbonyl compound.
(5) The polyphenylene ether-based resin composition according to any one of (1) to (4), wherein the (C) component is a mixture of the (C-1) component and the (C-2) component, and contains 50 to 95 mass % of the (C-1) component and 50 to 5 mass % of the (C-2) component per 100 mass % of the (C) component.
(6) The polyphenylene ether-based resin composition according to any one of (1) to (5), wherein the (D) component comprises a kaolin clay surface-treated with a silane compound.
(7) The polyphenylene ether-based resin composition according to any one of (1) to (6), wherein a sum of contents of the polyolefin-based resin and the styrene-based resin per 100 mass % of the polyphenylene ether-based resin composition is 5 mass % or less.
(8) The polyphenylene ether-based resin composition according to any one of (1) to (7), wherein a content of an inorganic filler other than the (D) component per 100 mass % of the polyphenylene ether-based resin composition is 3 mass % or less.
(9) The polyphenylene ether-based resin composition according to any one of (1) to (8), wherein a flame retardant level when a combustion test is performed in accordance with UL94 on a test specimen having a thickness of 1.5 mm is V-0.
(10) A molded article comprising a portion having a thickness of 1.5 mm or less and comprising the polyphenylene ether-based resin composition according to any one of (1) to (9).

Advantageous Effect

According to the present disclosure, it is possible to provide a polyphenylene ether-based resin composition containing a kaolin clay, which can be effectively used even in a use environment in which a favorable performance balance between the rigidity and the tenacity is required, has a good mold appearance, and is excellent in flame retardancy when molded into a thin molded article.

DETAILED DESCRIPTION

An embodiment of the present disclosure (hereinafter referred to as "the present embodiment") is described in detail below. The present disclosure is not limited to the following description, but may be selected from a variation within the scope of the subject thereof.
[Resin Composition]
A polyphenylene ether-based resin composition of the present embodiment contains a polyphenylene ether (A); a styrene-based thermoplastic elastomer (B); a flame retardant (C); and a kaolin clay (D), wherein, when a total content of the (A), (B), (C), and (D) components is taken as 100 mass %, a content of the (A) component is 25 to 84 mass %, a content of the (B) component is 1 to 20 mass %, a content of the (C) component is 4 to 25 mass %, and a content of the (D) component is 11 to 30 mass %, and the (C) component contains, per 100 mass % of the (C) component, 0 to 97 mass % of an organophosphorus flame retardant (C-1) having a 10-mass % reduction temperature in a range of 380 to 430° C. as measured by the following measurement method, and 100 to 3 mass % of an organophosphorus flame retardant (C-2) having a 10-mass % reduction temperature in a range of 330 to 360° C. as measured by the following measurement method:
<Measurement Method of the 10-Mass % Reduction Temperature of the (C-1) and (C-2) Components>
a 10-mass % reduction temperature is determined from a heating loss curve obtained by weighing out about 10 mg of the (C-1) component or (C-2) component, which is heated from 30° C. to 800° C. at a temperature rise rate of 10° C./min under a nitrogen atmosphere in a TGA measurement apparatus.
(Polyphenylene Ether (A))
The polyphenylene ether (A) contained in the polyphenylene ether-based resin composition of the present embodiment (hereinafter, the polyphenylene ether (A) is simply referred to as "(A) component") is preferably a homopolymer or a copolymer having a repeating unit (unit of structure) represented by the following chemical formula (2) and/or chemical formula (3):

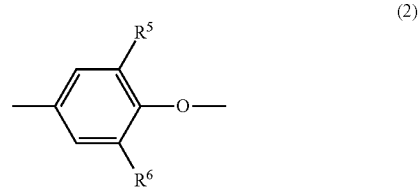

(2)

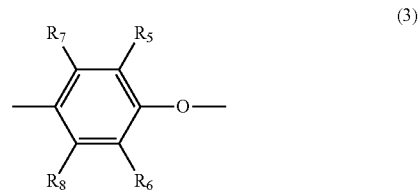

(3)

in the above chemical formulae (2) and (3), $R^5$, $R^6$, $R^7$, and $R^8$ each independently represent a hydrogen atom, an alkyl group having a carbon number of 1 to 4, an aryl group having a carbon number of 6 to 9, or a halogen atom with the proviso that $R^7$ and $R^8$ both cannot be hydrogen atoms.

In addition, the carbon number of the alkyl group is preferably 1 to 3, the carbon number of the aryl group is preferably 6 to 8, and among the monovalent residues listed above, a hydrogen atom is preferred.

Further, the number of repeating units represented by the above chemical formulae (2) and/or (3) may be varied depending on molecular weight distribution of the polyphenylene ether (A), and are thus not specifically limited.

Representative examples of homopolymers include poly (2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1, 4-phenylene) ether, poly(2-ethyl-6-isopropyl-1,4-phenylene) ether, poly(2-methyl-6-chloroethyl-1,4-phenylene) ether, poly(2-methyl-6-hydroxyethyl-1,4-phenylene) ether, and poly(2-methyl-6-chloroethyl-1,4-phenylene) ether.

Examples of copolymers include, but are not limited to, copolymers composed mainly of polyphenylene ether structures represented by the chemical formula (2) and/or chemical formula (3), such as a copolymer of 2,6-dimethylphenol and 2,3,6-trimethylphenol, a copolymer of 2,6-dimethylphenol and o-cresol, and a copolymer of 2,3,6-trimethylphenol and o-cresol.

Note that, in the present embodiment, the polyphenylene ether chain preferably contains, at least a part, a structure in which $R^5$ and $R^6$ in the chemical formula (2) are each a methyl group (and a structure derived from this structure as will be described later). Among these, poly(2,6-dimethyl-1, 4-phenylene)ether is preferred.

One of the above described polyphenylene ethers (A) may be used alone, or two or more polyphenylene ethers (A) may be used in a combination.

The concentration of terminal OH groups in the polyphenylene ether (A) is preferably from 0.4 to 2.0 and more preferably from 0.6 to 1.3, per 100 monomer units constituting the polyphenylene ether, from the viewpoint of achieving a sufficient adhesion to the kaolin clay as the component (D).

Note that the concentration of terminal OH groups in the polyphenylene ether (A) can be calculated from an NMR spectrum.

The polyphenylene ether (A) may contain a polyphenylene ether containing various phenylene ether units other than those represented by the above chemical formulae (2) and/or (3) as a partial structure thereof, so long as the heat resistance of the resin composition is not significantly reduced.

Examples of phenylene ether units other than those represented by the above chemical formulae (2) and/or (3) include, but are not limited to, a 2-(dialkylaminomethyl)-6-methylphenylene ether unit and a 2-(N-alkyl-N-phenylaminomethyl)-6-methylphenylene ether unit, as described in JP H01-297428 A or JP S63-301222 A, for example.

Moreover, a repeating unit derived from diphenoquinone or the like may be bonded in the polyphenylene ether main chain of the polyphenylene ether (A) in a small amount.

Further, the polyphenylene ether (A) may have a structure in which part or all of the constitutional units constituting the polyphenylene ether is replaced by a functionalized polyphenylene ether through reaction (modification) with a functionalizing agent having one or more functional groups selected from the group consisting of a carboxyl group, an acid anhydride group, an acid amide group, an imide group, an amino group, an orthoester group, a hydroxy group, and a group derived from an ammonium carboxylate salt.

In particular, from the viewpoint of improving adhesion to the kaolin clay as the component (D) and improving the heat resistance, the mechanical properties, and the like, a part or all of the polyphenylene ether (A) is preferably a functionalized polyphenylene ether obtained through a reaction of a polyphenylene ether with an acid anhydride such as maleic anhydride or a carboxylic acid such as malic acid, citric acid, or fumaric acid to achieve functionalization.

In the polyphenylene ether (A), from the viewpoint of further improving adhesion with the kaolin clay as the component (D), the concentration of functionalized modified terminals is preferably from 0.1 to 10, more preferably from 0.1 to 3.0, and even more preferably from 0.1 to 1.0, per 100 monomer units constituting the polyphenylene ether.

Note that the concentration of functionalized modified terminals of the polyphenylene ether (A) can be calculated from an NMR spectrum.

The ratio (value of Mw/Mn) of the weight average molecular weight Mw to the number average molecular weight Mn of the polyphenylene ether (A) is preferably from 2.0 to 5.5, more preferably from 2.5 to 4.5, and even more preferably from 3.0 to 4.5

The value of Mw/Mn is preferably 2.0 or more from the viewpoint of the moldability of the resin composition, and preferably 5.5 or less from the viewpoint of the mechanical properties of the resin composition.

In addition, the number average molecular weight Mn of the polyphenylene ether (A) is preferably from 8,000 to 28,000, more preferably from 12,000 to 24,000, and even more preferably from 14,000 to 22,000, from the viewpoint of the molding workability and the mechanical properties.

The weight average molecular weight Mw and the number average molecular weight Mn can be obtained from a polystyrene-equivalent molecular weights through measurement by gel permeation chromatography (GPC).

The reduced viscosity of the polyphenylene ether (A) is preferably within the range of 0.25 dL/g to 0.65 dL/g. The reduced viscosity is more preferably within the range of 0.30 dL/g to 0.55 dL/g, and even more preferably within the range of 0.33 dL/g to 0.42 dL/g.

The reduced viscosity of the polyphenylene ether (A) is preferably 0.25 dL/g or more from the viewpoint of providing sufficient mechanical properties, and is preferably 0.65 dL/g or less from the viewpoint of the molding processability.

Note that the reduced viscosity can be measured using a Ubbelohde viscometer at 30° C. in a 0.5-g/dL chloroform solution.

The polyphenylene ether (A) is generally available as powder, and the particle size thereof as the average particle diameter is preferably from 1 to 1000 µm, more preferably from 10 to 700 µm, and particularly preferably from 100 to 500 µm. The average particle diameter is preferably 1 µm or more from the viewpoint of handleability upon processing, and is preferably 1000 pnm or less for preventing the material from not being molten during melt kneading.

In the resin composition of the present embodiment, the content of the polyphenylene ether (A) is within a range of 25 to 84 mass %, when the total amount of the polyphenylene ether (A), the styrene-based thermoplastic elastomer (B), the flame retardant (C), and the kaolin clay (D) is taken as 100 mass %. The content of the polyphenylene ether (A) is preferably within the range of 35 to 70 mass %, and more preferably within the range of 40 to 60 mass %.

The content of the polyphenylene ether (A) is preferably 25 mass % or more from the viewpoint of imparting sufficient heat resistance and flame retardancy, and is preferably 84 mass % or less from the viewpoint of the molding workability and maintaining mold appearance.

(Styrene-Based Thermoplastic Elastomer (B))

The polyphenylene ether-based resin composition of the present embodiment contains a styrene-based thermoplastic elastomer (B) (hereinafter, the styrene-based thermoplastic elastomer (B) is simply referred to as "(B) component") from the viewpoint of improving the impact resistance, the tenacity, and the mold appearance of a molded article.

Unlike styrene-based resins, the styrene-based thermoplastic elastomer (B) used in the present embodiment is a block copolymer including a polystyrene block and a conjugated diene compound polymer block.

Preferably, the conjugated diene compound polymer block is one in which unsaturated bonds derived from a conjugated diene compound is hydrogenated at least at a hydrogenation ratio of 50% or more from the viewpoint of the thermal stability. The hydrogenation ratio is more preferably 80% or more, and even more preferably 95% or more.

Note that the hydrogenation ratio can be determined, for example, by a nuclear magnetic resonance (NMR) spectrometer.

Examples of the conjugated diene compound polymer block include, but are not limited to polybutadiene, polyisoprene, poly(ethylene-butylene), poly(ethylene-propylene), and vinyl-polyisoprene, for example.

One of the above conjugated diene compound polymer blocks may be used alone, or two or more of the conjugated diene compound polymer blocks may be used in combination.

The arrangement of repeating units composing the block copolymer may be a linear type or a radial type. Further, the block structure composed of the polystyrene block and the conjugated diene compound polymer block may be any of diblock type, triblock type, and tetrablock type. Among such block copolymers, a triblock linear-type block copolymer composed of a polystyrene-poly(ethylene-butylene)-polystyrene structure is preferable from the viewpoint that the desired effects of the present embodiment can be sufficiently achieved. Note that the conjugated diene compound polymer block may include a butadiene unit within a range not exceeding 30 mass %.

The production method of the styrene-based thermoplastic elastomer (B) is not specifically limited and any of well-known methods may be used. A specific example of well-known production methods is, for example, the method described in U.S. Pat. No. 4,501,857 B.

In addition, in the resin composition of the present embodiment, the styrene-based thermoplastic elastomer (B) preferably includes a styrene-based thermoplastic elastomer in which a part or all of the styrene-based thermoplastic elastomer is modified with an amino compound or a carbonyl compound from the viewpoint of improving the tenacity and the impact resistance, and maintaining surface appearance of an molded article.

In modification with a carbonyl compound, the carbonyl group is introduced into the styrene-based thermoplastic elastomer through a reaction of a carbonyl compound such as an unsaturated carboxylic acid or a functional derivative thereof with the styrene-based thermoplastic elastomer.

Examples of an unsaturated carboxylic acid or a functional derivative thereof include maleic acid, fumaric acid, itaconic acid, maleic halide, cis-4-cyclohexene-1,2-dicarboxylic acid, endo-cis-bicyclo[2,2,1]-5-hepten-2,3-dicarboxylic acid, and the like, and anhydrides, esters, amides, imides, and the like of these dicarboxylic acids, as well as acrylic acid, methacrylic acid, and the like, and esters and amides of these monocarboxylic acids.

One of these may be used alone, or two or more of these may be used in combination.

In the styrene-based thermoplastic elastomer modified with a carbonyl compound, the amount of the carbonyl compound added is preferably from 0.01 to 2 parts by mass, more preferably 0.05 to 1 parts by mass, and even more preferably from 0.1 to 1 parts by mass, per 100 parts by mass of the styrene-based thermoplastic elastomer from the viewpoint of achieving sufficient adhesion to the kaolin clay as the (D) component.

An example of a production method of a styrene-based thermoplastic elastomer modified with a carbonyl compound is a method in which a carbonyl compound is added and the mixture is melt-kneaded into a styrene-based thermoplastic elastomer in the presence of a radical polymerization initiator to carry out a reaction, for example.

In modification with an amino compound, an amino group is introduced into the styrene-based thermoplastic elastomer through a reaction of an amino compound such as an imidazolidinone compound or a pyrrolidone compound with the styrene-based thermoplastic elastomer.

Examples of the imidazolidinone compound include 1,3-diethyl-2-imidazolidinone, 1,3-dimethyl-2-imidazolidinone, 1,3-dipropyl-2-imidazolidinone, 1-methyl-3-ethyl-2-imidazolidinone, 1-methyl-3-(2-ethoxyethyl)-2-imidazolidinone, 1,3-di-(2-ethoxyethyl)-2-imidazolidinone, 1,3-dimethylethylene thiourea, N,N'-diethylpropylene urea, and 1,3-dimethyl-3,4,5,6-tetrahydro-2(1H)-pyrimidinone, for example, among which, 1,3-dimethyl-2-imidazolidinone is preferred.

Examples of the pyrrolidone compound include 1-cyclohexyl-2-pyrrolidone, 1-butyl-2-pyrrolidone, 1-ethyl-2-pyrrolidone, 1-propyl-2-pyrrolidone, 1-butyl-2-pyrrolidone, 1-isopropyl-2-pyrrolidone, 1,5-dimethyl-2-pyrrolidone, 1-methoxymethyl-2-pyrrolidone, 1-methyl-2-piperidone, 1,4-dimethyl-2-piperidone, 1-ethyl-2-piperidone, 1-isopropyl-2-piperidone, and 1-isopropyl-5,5-dimethyl-2-piperidone, for example, and among them, 1-methyl-2-piperidone is preferred.

One of these may be used alone, or two or more of these may be used in combination.

In the styrene-based thermoplastic elastomer modified with an amino compound, the amount of the amino compound added is preferably from 0.01 to 2 parts by mass, more preferably from 0.05 to 1 parts by mass, and even more preferably from 0.1 to 1 parts by mass, per 100 parts by mass of the styrene-based thermoplastic elastomer, from the viewpoint of achieving sufficient adhesion to the kaolin clay as the (D) component.

An example of a production method of a styrene-based thermoplastic elastomer modified with an amino compound is a method in which an amino compound is added to a styrene-based thermoplastic elastomer and a reaction is allowed to take place at 70 to 120° C.

One of these styrene-based thermoplastic elastomers modified with an amino compound or a carbonyl compound may be used alone, or two or more of these may be used in combination.

In addition, all of the (B) component may be a styrene-based thermoplastic elastomer modified with an amino compound or a carbonyl compound, or a styrene-based thermoplastic elastomer which is not modified with an amino compound or a carbonyl compound may be used in combination with a styrene-based thermoplastic elastomer modified with an amino compound or a carbonyl compound as the (B) component. The content of the styrene-based thermoplastic elastomer modified with an amino compound or a carbonyl compound per 100 mass % of the (B) component is preferably 50 to 100 mass %.

The amount of bound styrene in the styrene-based thermoplastic elastomer (B) of the present embodiment is preferably in the range of 10 to 90 mass %, more preferably in the range of 20 to 80 mass %, even more preferably in the range of 30 to 70 mass %, and still even more preferably in the range of 40 to 65 mass %. The amount of bound styrene is preferably 10 mass % or more from the viewpoint of miscibility of the (A) component and the (B) component, and is preferably 90 mass % or less from the viewpoint of imparting a sufficient impact resistance.

The number average molecular weight of the styrene-based thermoplastic elastomer (B) of the present embodiment is preferably from 30,000 to 500,000, more preferably from 40,000 to 300,000, and even more preferably from 45,000 to 250,000. From the viewpoint of imparting a sufficient tenacity to a molded article, a range from 30,000 to 500,000 is preferred.

The ratio (value of Mw/Mn) of the weight average molecular weight Mw to the number average molecular weight Mn of the styrene-based thermoplastic elastomer (B) of the present embodiment obtained from the polystyrene-equivalent molecular weights is preferably within the range of 1.0 to 3.0, more preferably 1.0 to 2.0, and even more preferably 1.0 to 1.5. From the viewpoint of mechanical properties, a range of 1.0 to 3.0 is preferred.

The content of the styrene-based thermoplastic elastomer (B) in the resin composition of the present embodiment is within the range of 1 to 20 mass %, when the total amount of the polyphenylene ether (A), the styrene-based thermoplastic elastomer (B), the flame retardant (C), and the kaolin clay (D) is taken as 100 mass %. The content is preferably within the range of 3 to 15 mass %, more preferably within the range of 4 to 10 mass %. The styrene-based thermoplastic elastomer (B) is preferably contained in an amount of 1 mass % or more from the viewpoint of improvement in the tenacity and the mold appearance, and is preferably contained in an amount of 20 mass % or less from the viewpoint of the flame retardancy and maintaining mechanical properties.

(Flame Retardant (C))

The flame retardant (C) used in the polyphenylene ether-based resin composition of the present embodiment (C) is a flame retardant which contains, per 100 mass % of the (C) component, 0 to 97 mass % of an organophosphorus flame retardant (C-1) having a 10-mass % reduction temperature in a range of 380 to 430° C. as measured by the following measurement method, and 100 to 3 mass % of an organophosphorus flame retardant (C-2) having a 10-mass % reduction temperature in a range of 330 to 360° C. as measured by the following measurement method, from the viewpoint of reduction in the environmental load and the flame retardant performance.

<Measurement Method of the 10-Mass % Reduction Temperature of the (C-1) and (C-2) Components> a 10-mass % reduction temperature (temperature at which the mass is reduced by 10 mass %) is determined from a heating loss curve obtained by weighing out about 10 mg of the (C-1) component or (C-2) component, which is heated from 30° C. to 800° C. at a temperature rise rate of 10° C./min under a nitrogen atmosphere in a thermogravimetric analysis (TGA) measurement apparatus.

The (C-1) component is preferably Bisphenol A bisdiphenyl phosphate, and the (C-2) component is preferably a condensation type phosphate ester-based flame retardant represented by the following chemical formula (1).

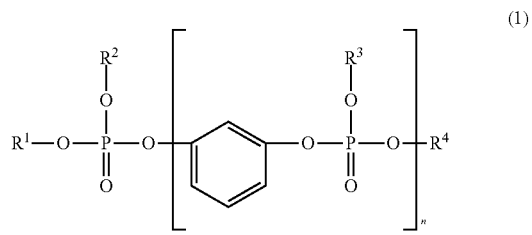

In the formula, $R^1$ to $R^4$ are 2,6-xylyl groups; n is selected from 1 to 3, and n is preferably 1 or 2, and n is more preferably 1.

Usage of a mixture containing 0 to 97 mass % of (C-1) and 100 to 3 mass % of (C-2) per 100 mass % in the component (C) as the flame retardant (C) can reduce the variation in the burning time among test specimens during a vertical burning test (in accordance with UL94) which will be described later.

In the resin composition of the present embodiment, a combination of the (C-1) and the (C-2) is preferably used as the flame retardant (C) from the viewpoint of imparting a sufficient flame retardancy and prevention of adhesion of mold deposit (MD) to a mold. When the content of the component (C) is taken as 100 mass %, a combination of 97 to 30 mass % of (C-1) and 3 to 70 mass % of (C-2) is preferred, a combination of 97 to 50 mass % of (C-1) and 3 to 50 mass % of (C-2) is more preferred, a combination of 96 to 50 mass % of (C-1) and 4 to 50 mass % of (C-2) is even more preferred, a combination of 95 to 50 mass % of (C-1) and 5 to 50 mass % of (C-2) is still even more preferred, and a combination of 95 to 70 mass % of (C-1) and 5 to 30 mass % of (C-2) is particularly preferred.

The content of the flame retardant (C) in the resin composition of the present embodiment is within the range of 4 to 25 mass %, when the total amount of the polyphenylene ether (A), the styrene-based thermoplastic elastomer (B), the flame retardant (C), and the kaolin clay (D) is taken as 100 mass %. The content is preferably within the range of 8 to 20 mass %, and more preferably within the range of 12 to 18 mass %. The flame retardant (C) is preferably contained in an amount of 4 mass % or more from the viewpoint of improvement in the flame retardancy and improvement in the mold appearance of the resin composition of the present embodiment, and is preferably blended in an amount of 25 mass % or less from the viewpoint of providing a sufficient mechanical properties and maintaining heat resistance.

Note that the components in the resin composition of the present embodiment can be separated from each other using a solvent by performing an operation such as filtration, concentration, and centrifugal separation.

Further, the flame retardant (C) component can be qualitatively and/or quantitatively analyzed by performing the analysis procedure on the separated flame retardant (C) using analytical apparatuses such as a GC-MS and an NMR.

(Kaolin Clay (D))

The kaolin clay (D) is blended into the polyphenylene ether-based resin composition of the present embodiment for the purpose of maintaining mold appearance and improving the mechanical strength.

Well-known types of kaolin clays can be used as the kaolin clay (D), and examples thereof include a water elutriated kaolin clay and a calcined kaolin clay, for example. Among these, a water elutriated kaolin clay is preferred for the purpose of the present disclosure.

The particle size of the primary particles of kaolin clay (D) as the average primary particle diameter is preferably from 0.01 to 1 μm, more preferably from 0.05 to 0.8 μm, and particularly preferably from 0.1 to 0.5 μm. The particle size is preferably 0.01 μm or more from the viewpoint of providing a sufficient rigidity, and is preferably 1 μm or less from the viewpoint of maintaining surface appearance of the molded article and imparting tenacity.

The heating loss of the kaolin clay (D) (as used herein, the heating loss is the ratio of reduction of the mass after being heated for 2 hours in an oven that is set to a temperature of 200° C., to the mass prior to the heating) is preferably 10 mass % or less, more preferably 5 mass % or less, even more preferably 2 mass % or less, and particularly preferably 1 mass % or less. From the viewpoint of mass productivity and the stability of production of the resin composition, the heating loss is preferably 10 mass % or less.

The kaolin clay (D) used in the present embodiment is preferably a kaolin clay which has been surface-treated with a treatment agent such as a silane compound in advance from the viewpoint of improving the dispersibility into the resin composition and improving adhesion to the resin.

Specific examples of a silane compound used in the surface treatment of the kaolin clay (D) include vinylsilane compounds such as vinyltrichlorosilane, vinyltriethoxysilane, and γ-methacryloxypropyltrimethoxysilane, epoxysilane compounds such as γ-glycidoxypropyltrimethoxysilane, sulfur silane compounds such as bis-(3-triethoxysilylpropyl)tetrasulfide, mercaptosilane compounds such as γ-mercaptopropyl trimethoxysilane, and aminosilane compounds such as γ-aminopropyltriethoxysilane and γ-ureidopropyltriethoxysilane. Particularly preferred silane compounds for the purpose of the present disclosure are mercaptosilane compounds and aminosilane compounds from the viewpoint of the dispersibility into the resin composition and the handleability, and mercaptosilane compounds are particularly preferred.

One of these silane compound may be used alone, or two or more of the silane compounds may be used in combination.

In addition, all of the component (D) may be a kaolin clay surface-treated with such a silane compound, or a kaolin clay surface-treated with a surface treatment agent other than a silane compound or a kaolin clay not subjected to surface treatment may be used in combination with a kaolin clay surface-treated with such a silane compound as the component (D). The content of the kaolin clay surface-treated with the silane compound per 100 mass % of the component (D) is preferably 50 to 100 mass %.

The content of the kaolin clay (D) in the resin composition of the present embodiment is within the range of 11 to 30 mass %, when the total amount of the polyphenylene ether (A), the styrene-based thermoplastic elastomer (B), the flame retardant (C), and the kaolin clay (D) is taken as 100 mass %. The amount is preferably within the range of 15 to 25 mass %, and more preferably within the range of 17 to 20 mass %. The content of the flame retardant (C) is preferably 11 mass % or more from the viewpoint of imparting a sufficient rigidity, and is preferably 30 mass % or less from the viewpoint of maintaining the surface appearance, the impact resistance, and the tenacity of a molded article.

The sum of the contents of the components (A), (B), (C), and (D) in the polyphenylene ether-based resin composition of the present embodiment preferably accounts for 90 mass % or more of the entire resin composition, from the viewpoint of further improving the heat resistance, the mechanical properties, the flame retardancy, and the surface appearance of a molded article. The sum of the contents is more preferably 95 mass % or more, and may be 100 mass %.

(Other Materials)

The polyphenylene ether-based resin composition of the present embodiment may further contain a polyolefin-based resin and/or a styrene-based resin.

Examples of the polyolefin-based resin include polyolefin resins such as polyethylene and polypropylene, and polyolefin-based copolymers such as ethylen-propylene copolymers, ethylen-octene copolymers, ethylen-ethylacrylate copolymers, and ethylen-ethylmethacrylate copolymers.

One polyolefin-based resin may be used alone, or two or more polyolefin-based resins may be used in combination.

Styrene-based resins are polymers obtained through polymerization of a styrene-based compound, or a styrene-based compound and a compound that is copolymerizable with the styrene-based compound, in the presence or absence of a rubbery polymer.

One styrene-based resin may be used alone, or two or more styrene-based resins may be used in combination.

Examples of the styrene-based compound include, but are not limited to, styrene, α-methylstyrene, 2,4-dimethylstyrene, monochlorostyrene, p-methylstyrene, p-tert-butylstyrene, and ethylstyrene, for example. In particular, styrene is preferred from the viewpoint of practicality of the raw material.

Examples of the compound that is copolymerizable with the styrene-based compound include, but are not limited to, methacrylic acid esters such as methyl methacrylate and ethyl methacrylate; unsaturated nitrile compounds such as acrylonitrile and methacrylonitrile; and acid anhydrides such as maleic anhydride.

The used amount of the compound that is copolymerizable with the styrene-based compound is preferably 30 mass % or less, and more preferably 15 mass % or less relative to 100 mass % of the total amount of the styrene-based compound and the compound that is copolymerizable with the styrene-based compound.

Examples of the rubbery polymer include, but are not limited to, a conjugated diene rubber, a copolymer of a conjugated diene and an aromatic vinyl compound, and an ethylene-propylene copolymer-based rubber, and more specifically polybutadiene, a styrene-butadiene random copolymer, a styrene-butadiene block copolymer, and a polymer obtained through partial or almost complete hydrogenation of these.

Note that, among the styrene-based resins described above, a polymer or copolymer obtained by polymerization or copolymerization in the presence of a rubbery polymer is referred to as a rubber-reinforced styrene-based resin, and a polymer or copolymer obtained by polymerization or copolymerization in the absence of a rubbery polymer is referred to as a styrene-based resin which is not rubber-reinforced.

The styrene-based resin is preferably a styrene-based resin which is not rubber-reinforced from the viewpoint of retaining the appearance of a molded article.

In the resin composition of the present embodiment, the content of the polyolefin-based resin and/or the styrene-based resin is preferably 5 mass % or less based on 100 mass % of the resin composition, as the sum of the contents of the polyolefin-based resin and the styrene-based resin. The amount is more preferably 3 mass % or less and even more preferably 2 mass % or less. The sum of the contents of the polyolefin-based resin and the styrene-based resin is preferably 5 mass % or less from the viewpoint of the mechanical properties and the flame retardancy of the resin composition.

The content of the polyolefin-based resin in the resin composition of the present embodiment is preferably 5 mass % or less, more preferably 2 mass % or less, and even more preferably 1 mass % or less relative to 100 mass % of the resin composition.

The content of styrene-based resin in the resin composition of the present embodiment is preferably 5 mass % or less, more preferably 3 mass % or less, and even more preferably 2 mass % or less relative to 100 mass % of the resin composition.

In addition, in the resin composition of the present embodiment, an antioxidant, an ultraviolet absorber, a stabilizer such as a heat stabilizer, a colorant, a mold release agent, and the like may be contained in the resin composition of the present application in a ratio of 0.001 to 3 mass % to the extent that the heat resistance, the mechanical properties, the flame retardancy, and the surface appearance of a molded article are not significantly reduced. The ratio is preferably 0.01 to 2 mass %, and is more preferably within the range of 0.2 to 1 mass %.

The ratio is preferably 0.001 mass % or more from the viewpoint of achieving a sufficient effect of the addition, and is preferably 3 mass % or less from the viewpoint of maintaining the physical properties.

In the resin composition of the present embodiment, an inorganic filler other than the kaolin clay (D) is preferably contained in the resin composition of the present application in an amount of 3 mass % or less to the extent that the physical properties such as the tenacity, the impact resistance, and the flame retardancy are not significantly reduced. The amount is more preferably 1 mass % or less and even more preferably 0.5 mass % or less.

Note that examples of the inorganic filler other than the kaolin clay (D) include, but are not limited to, for example, glass fibers, carbon fibers, mica, glass flakes, talc, glass milled fibers, chlorite, and organoclays.

[Production Method of Resin Composition]

The resin composition of the present embodiment can be produced by melt-kneading the component (A), the component (B), the component (C), the component (D), and optional other materials.

The method of preparing the resin composition of the present embodiment preferably employs, but is not limited to, a twin screw extruder from the viewpoint of production efficiency, for the purpose of massive and stable production of the resin composition.

The screw diameter of the twin screw extruder is preferably within the range of 25 to 90 mm, and is more preferably within the range of 40 to 70 mm. For example, a method by melt-kneading under conditions of a cylinder temperature of 270 to 330° C., a screw rotating rate of 150 to 600 rpm, and an extrusion rate of 40 to 300 kg/h, using a ZSK40MC twin screw extruder (manufactured by Werner & Pfleiderer, Germany, number of barrels: 13, screw diameter: 40 mm, L/D=50; having the screw pattern with 2 kneading discs L, 6 kneading discs R, and 4 kneading discs N), and a method by melt-kneading under conditions of a cylinder temperature 270 to 330° C., a screw rotation number of 150 to 600 rpm, and an extrusion rate of 250 to 700 kg/h, using a TEM58SS twin screw extruder (manufactured by Toshiba Machine Co., Ltd., number of barrels: 13, screw diameter: 58 mm, L/D=53; having the screw pattern with 2 kneading discs L, 14 kneading discs R, and 2 kneading discs N) can be used as a preferable method.

Here, the "L" is the "screw barrel length" of the extruder, and the "D" is the "screw barrel diameter".

Although the conditions for producing the resin composition of the present application embodiment are not limited to the following, the resin composition may be produced by melt-kneading the (A), (B), (C), and (D) components and optional other materials all together.

Alternatively, upon production of the resin composition of the present embodiment using a twin screw extruder, from the viewpoint of improving the mechanical properties and sufficiently achieving the effects of the present disclosure, the resin composition is preferably produced by feeding and melting-kneading the components (A), (B), (C-2), and (D) and other materials in advance from a supply port (top feed) at the most upstream portion of the extruder and then adding the components (C-1) from an extruder barrel at a midstream using a liquid addition apparatus, followed by sufficient melt-kneading.

Further, from the viewpoint of imparting the heat resistance and the mechanical properties, it is preferable that the (A) component, the (C-2) component, and the (D) component are fed from the supply port at the most upstream portion of the extruder (top feed), and the (C-1) component is fed from an extruder supply port (liquid addition nozzle) provided at a midstream of the extruder and the (B) component is fed from the raw material pressing supply port (side feed) provided at a midstream of the extruder.

[Physical Properties of Resin Composition]

The resin composition of the present disclosure preferably has a flame retardance level (in accordance with UL 94) of V-0 when a vertical burning test is performed on a strip-shaped test specimen having a thickness of 1.5 mm from the viewpoint of preventing spread of flame upon ignition of flame such as upon fire.

Further, when a perpendicular combustion test in accordance with UL94 is carried out on five test specimens, the difference in the burning time between the minimum burning time in seconds and the maximum burning time in seconds measured at the first burner flame application and the second burner flame application (five pieces×twice=10 flame applications in total) is preferably within 5 seconds.

Specifically, the flame retardancy level, the minimum burning time in seconds, and the maximum burning time in seconds of the resin composition can be measured with the method described in the Examples section below.

The tensile strength (measured at 23° C. in accordance with ISO 527) of the resin composition of the present embodiment is preferably 50 MPa or more from the viewpoint of retaining the shape and preventing cracks upon usage. The tensile strength is more preferably 60 MPa or more, and even more preferably 65 MPa or more.

Specifically, the tensile strength of the resin composition can be measured with the method described in the Examples section below.

The tensile elongation (measured at 23° C. in accordance with ISO 527) of the resin composition of the present embodiment is preferably 10% or more from the viewpoint of retaining the shape and preventing cracks upon usage. The tensile elongation is more preferably 14% or more, and even more preferably 20% or more. When the tensile elongation is within any of the above ranges, the resin composition tends to be more suitably used for the application of covers of fire detectors.

Specifically, the tensile elongation of the resin composition can be measured with the method described in the Examples section below.

The flexural strength (measured at 23° C. in accordance with ISO 178) of the resin composition of the present embodiment is preferably 80 MPa or more from the viewpoint of retaining the shape of the resin composition upon usage of a thin molded article. The he flexural strength is more preferably 90 MPa or more, and more preferably 100 MPa or more.

Specifically, the flexural strength of the resin composition can be measured with the method described in the Examples section below.

The flexural modulus (measured at 23° C. in accordance with ISO 178) of the resin composition of the present embodiment is preferably 3000 MPa or more from the viewpoint of retaining the shape of the resin composition upon usage of a thin molded article. The flexural modulus is more preferably 3400 MPa or less, and even more preferably 3700 MPa or less.

Specifically, the flexural modulus of the resin composition can be measured with the method described in the Examples section below. The Charpy impact strength (measured at 23° C. in accordance with ISO 179) of the resin composition of the present embodiment is preferably 2 kJ/m$^2$ or more from the viewpoint of preventing cracking upon usage. The Charpy impact strength is more preferably 4 kJ/m$^2$ or more, and even more preferably 5 kJ/m$^2$ or more.

Specifically, the Charpy impact strength of the resin composition can be measured with the method described in the Examples section below.

The deflection temperature under load (DTUL) (in accordance with ISO 75, measured with the flatwise method under a load of 0.45 MPa) of the resin composition of the present embodiment is preferably 100° C. or higher from the viewpoint of preventing thermal deformation upon usage of a thin molded article at high temperatures. The DTUL is more preferably 115° C. or higher, and even more preferably 125° C. or higher.

Specifically, the DTUL of the resin composition can be measured with the method described in the Examples section below.

[Molded Article]

A molded article formed from the resin composition of the present embodiment can be obtained by molding the resin composition described above.

Even if a molded article of the present embodiment has a portion having a small thickness (for example, 1.5 mm or less), molding defects such as silver streaks (silver) do not occur, has a good appearance, and is excellent in flame retardancy.

Particularly, the molded article of the present embodiment is preferably a thin molded article having a thickness of 2.0 mm to 0.5 mm, and has a flame retardancy level of V-0 when a vertical burning test is carried out in accordance with UL94. This can prevent spread of flame upon ignition of flame in the interior of the device or the like of the thin molded article.

The method for molding the resin composition is not specifically limited, but is preferably, for example, injection molding, extrusion molding, vacuum molding, pressure molding, etc., in particular injection molding is preferred from the viewpoint of the appearance characteristic and the mass productivity of the molded article.

Examples of preferred molded articles are components for covers of fire detectors because of their excellent performance balance between the rigidity and the tenacity, good mold appearance, and excellent flame retardancy, particularly of thin molded pieces.

EXAMPLES

The following explains the present disclosure through specific examples and comparative examples. However, the present disclosure is not limited to the following examples.

Measurement methods and raw materials used in the examples and comparative examples are as follows.

(1. Deflection Temperature Under Load (DTUL))

Pellets of the resin composition produced in the examples and the comparative examples were dried in a hot-air dryer at 90° C. for 1 hours.

An injection molding machine (IS-80EPN, manufactured by Toshiba Machine Co., Ltd.) having a mold for ISO physical property test specimens attached thereto was used to mold the dried resin composition with settings of a cylinder temperature of 300° C., a mold temperature of 90° C., an injection pressure of 50 MPa (gauge pressure), an injection speed of 200 mm/sec, and an injection time/cooling time of 20 secs/20 secs to thereby mold ISO 3167 Type A dumbbell multi-purpose molded pieces. An obtained Type A dumbbell multi-purpose test specimen molded piece was cut into test specimens of 80 mm×10 mm×4 mm. The deflection temperature under load (DTUL) (° C.) of each test specimen was measured under 0.45 MPa by the flatwise method in accordance with ISO 75, and the mean value of the DTULs of three test specimens was determined.

The evaluation criteria were such that a higher mean value of the measured values was determined to indicate a better heat resistance.

(2. Charpy Impact Strength)

An molded piece of the ISO 3167 Type A dumbbell multi-purpose test specimen produced in the aforementioned 1. was cut into test specimens of 80 mm×10 mm×4 mm. The Charpy impact strength (notched) (kJ/m$^2$) of each test specimen was measured at 23° C. in accordance with ISO 179 using the test specimen and the mean value of five test specimens was determined.

The evaluation criteria were such that a higher mean value of the measured values was determined to indicate better impact resistance.

(3. Tensile Strength and Tensile Elongation)

The tensile strength (MPa) and the tensile elongation (tensile nominal strain) (%) of an molded piece of the ISO 3167 Type A dumbbell multi-purpose test specimen produced in the aforementioned 1. were measured at 23° C. at 5 mm/min in accordance with ISO 527. The mean value of five test specimens was determined.

The evaluation criteria were such that a higher mean value of the measured values of the tensile elongation was determined to indicate a better tenacity and, in particular, a mean value of 10% or greater was determined to be preferable for the resin composition of the present embodiment. Further, a higher mean value of the measured values of the tensile strength was determined to indicate better mechanical properties and, in particular, a mean value of 50 MPa or greater was determined to be preferable for the resin composition of the present embodiment.

(4. Flexural Strength and Flexural Modulus)

An molded piece of the ISO 3167 Type A dumbbell multi-purpose test specimen produced in the aforementioned 1. was cut into test piece of 80 mm×10 mm×4 mm. The flexural strength (MPa) and the flexural modulus (MPa) of a test specimen were measured at 23° C. in accordance with ISO 178, and the mean value of three test specimens was determined.

The evaluation criteria were such that a higher mean value of the measured values of the flexural modulus was determined to indicate better rigidity and, in particular, a mean value of 3000 MPa or greater was determined to be preferable for the resin composition of the present embodiment. Further, a higher mean value of the measured values of the flexural strength was determined to indicate better mechanical properties and, in particular, a mean value of 80 MPa or greater was determined to be preferable for the resin composition of the present embodiment.

(5. Appearance of Molded Article (Occurrence of Silver))

Pellets of the resin composition produced in the examples and the comparative examples were dried in a hot-air dryer at 90° C. for 1 hours.

An injection molding machine (IS-80EPN, manufactured by Toshiba Machine Co., Ltd.) having a mold for 1.5-mm thick UL test specimens attached thereto was used to mold the dried resin composition with settings of a cylinder temperature of 300° C. and a mold temperature of 80° C. in Comparative Examples 1 to 3, Examples 1 to 14, and Examples 18 to 22, a cylinder temperature of 320° C. and a mold temperature of 90° C. in Example 15 and Comparative Example 4, or a cylinder temperature of 260° C. and a mold temperature of 60° C. in Examples 16 and 17 and Comparative Example 5, an injection speed of 25% (panel setting value), an injection time/cooling time of 10 secs/30 secs, and an injection pressure of the short-short pressure (SSP)+5 MPa (gauge pressure), to thereby mold 1.5-mm thick UL test specimens.

For 20 1.5-mm thick UL test specimens, the total number of silvers having lengths of 2 mm or more observed on surfaces of the test specimens was visually counted, to determine the level of mold appearance.

The evaluation criteria were as follows: A when the count of silvers was 0 to 2, B when the count of silvers was 3 to 5, C when the count of silvers was 6 to 9, and D when the count of silvers was 10 or more. When the appearance of the thin molded article was B or higher, the composition was evaluated to be excellent. When the appearance of the thin molded article was A, the composition was evaluated to be particularly preferable as the resin composition of the present embodiment.

(6. Evaluation of Mold MD)

Pellets of the resin composition produced in the examples and the comparative examples were dried in a hot-air dryer at 90° C. for 1 hours. An injection molding machine (IS-80EPN, manufactured by Toshiba Machine Co., Ltd.) having a pin-gate flat-plate mold having dimensions of 150 mm×150 mm×2 mm (thickness) attached thereto was used to mold the dried resin composition with settings of a cylinder temperature of 300° C. and a mold temperature of 80° C. in Comparative Examples 1 to 3, Examples 1 to 14, and Examples 18 to 22, a cylinder temperature of 320° C. and a mold temperature of 90° C. in Example 15 and Comparative Example 4, or a cylinder temperature of 260° C. and a mold temperature of 60° C. in Examples 16 and 17 and Comparative Example 5, and an injection pressure (gauge pressure: 70 MPa), an injection speed (panel setting value) of 85%, and an injection time/cooling time of 10 secs/30 secs to thereby continuously mold flat plates.

The MD adhesion was scored as follows: D when MD adhesion to the mold was visually observed subsequent to continuous molding of 200 shots, B when MD adhesion to the mold was visually observed subsequent to continuous molding of 300 shots, and A when no MD adhesion to the mold was visually observed subsequent to continuous molding of 300 shots.

The evaluation criteria were as follows: the composition was evaluated to be excellent when the score of B or higher, and the composition was evaluated to be particularly preferable as the resin composition of the present embodiment when the score is A.

(7. Flame Retardancy of Thin Portion)

Five 1.5-mm thick stripe-shaped test specimens obtained in the aforementioned 5. were evaluated based on the UL 94 vertical burning test method to determine the flame retardance level. In addition, the burning time in seconds after the first burner flame application and the burning time in seconds after the second burner flame application of each of the stripe-shaped test specimens were measured (five pieces× twice=10 flame applications in total), and the difference between the minimum burning time in seconds and the maximum burning time in seconds was calculated.

The flame retardancy was determined to be excellent when the flame retardancy level was V-0. In particular, the resin composition of the present embodiment was determined to be particularly preferable when the flame retardancy level was determined to be V-0 and the time difference between the minimum burning time in seconds and the maximum burning time in seconds was within 5 seconds.

[Raw Materials]

<Polyphenylene Ether (A)>

(A-1) poly(2,6-dimethyl-1,4-phenylene)ether powder (A-1) which had a reduced viscosity of 0.50 dL/g (measured in a 0.5-g/dL chloroform solution at 30° C. with a Uberode viscometer), a number average molecular weight of 18,300, a number of terminal OH groups per 100 units of 0.71, a number of N,N-dibutylaminomethyl groups per 100 units of 0.39 were prepared by solution polymerisation (hereinafter also referred to simply as "A-1").

<Styrene-Based Thermoplastic Elastomer (SEBS) (B)>

(B-1) Non-modified styrene-based thermoplastic elastomer, trade name: Tuftec H1041®, manufactured by Asahi Kasei Corporation (hereinafter, sometimes referred to as "(B-1)").

(B-2) Carbonyl-modified styrene-based thermoplastic elastomer. To 100 parts by mass of (B-1) described above, 1.0 parts by mass of maleic anhydride and 0.5 parts by mass of PERBUTYL D manufactured by NOF CORPORATION were mixed to give a uniform mixture, which was then melt-kneaded at 260° C. using a twin screw extruder, to thereby obtain a thermoplastic elastomer modified with maleic anhydride (B-2) (hereinafter, sometimes referred to as "(B-2)"). The amount of maleic anhydride added to 100 parts by mass of (B-1) determined by the titration method using sodium methylate was about 0.3 parts by mass.

(B-3) Amino-modified styrene-based thermoplastic elastomers. In a reactor which was equipped with an agitator and charged with a cyclohexane solvent and substituted with nitrogen gas, a block copolymer which had a number average molecular weight of 40,000, an amount of bound styrene of 30 mass %, a 1,2-vinyl bond amount of butadiene of 38%, had the structure of polystyrene-polybutadiene-polystyrene, and had polymer chain terminal having a living lithium ion structure was polymerized using n-butyllithium as a polymerization initiator. After completion of the polymerization, 1,3-dimethyl-2-imidazolidinone was added in the amount (in mol) of 1.5 times of the amount of lithium ions present in the polymer solution which was dependent on the amount of n-butyllithium used. The reaction was allowed to take place at 95° C. for 10 minutes. Then, a hydrogenation reaction was allowed to take place quantitatively and continuously until the amount of ethylene unsaturated bonds of the polybutadiene moiety became less than 20% by the method described in U.S. Pat. No. 4,501,857 B to obtain a polymer having a hydrogenation ratio of 81.6%. To the polymer solution after the hydrogenation reaction, 0.3 g of 2,6-di-methylbutyl-p-cresol was added as a thermal degradation stabilizer to 100 g of the polymer. Cyclohexane as a solvent was then removed by heating to obtain a styrene-based thermoplastic elastomer (B-3) having a structure of polystyrene-hydrogenated polybutadiene-polystyrene and having a secondary amine added to the polystyrene chain terminal (hereinafter, sometimes referred to as "(B-3)").

<Flame Retardant (C)>

The 10-mass % reduction temperature of the flame retardant (C) was measured using the following apparatus under the following condition.

Amount of sample measured: About 10 mg
Measurement apparatus: BRUKER Control MTC1000SA
Reactor: TGA-DTA2000SR
Measurement condition: The temperature was raised from 30° C. to 800° C. at a heating rate of 10° C./min under a nitrogen atmosphere. (C-1) Bisphenol A bisdiphenyl phosphate (aromatic phosphate ester-based flame retardant, trade name: CR-741©, manufactured by Daihachi Chemical Industry Co., Ltd.; 10-mass % reduction temperature: 417° C. (hereinafter sometimes referred to as "(C-1)"). (C-2-1) Compound represented by the following chemical formula (5) (solid state at normal temperature (23° C.); trade name: PX-200®, manufactured by Daihachi Chemical Industry Co., Ltd.; 10-mass % reduction temperature: 348° C.) (hereinafter sometimes referred to as "(C-2-1)").

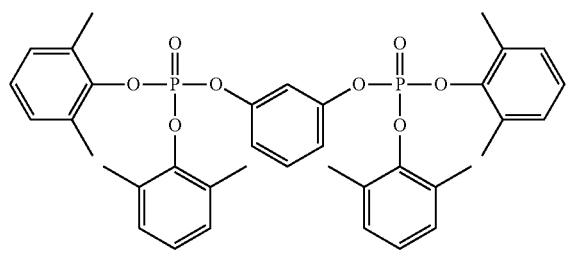

(5)

(C-2-2) Phosphazene-based flame retardant (trade name: Rabitle FP-110®, manufactured by FUSHIMI Pharmaceutical Co., Ltd.; 10-mass % reduction temperature: 355° C.) (hereinafter, sometimes referred to as "(C-2-2)")
(C-2-3) 10-(2,5-Dihydroxyphenyl)-9,10-dihydro-9-oxa-10-phosphaphenanthre ne-10-oxide (trade name: HCA-HQ®, manufactured by SANKOSHA CO., LTD.; 10-mass % reduction temperature: 348° C.) (hereinafter, sometimes referred to as "(C-2-3)")

<Kaolin Clay (D)>

(D-1) Kaolin clay having an average primary particle diameter of 0.2 μm which had not been surface-treated (trade name: Polyfil HG 90©, manufactured by J.M. Huber Corporation, USA) (hereinafter, sometimes referred to as "(D-1)").
(D-2) Kaolin clay having an average primary particle diameter of 0.2 μm which had been surface-treated with a mercaptosilane compound (trade name: Nucap 290®, manufactured by J.M. Huber Corporation, USA) (hereinafter, sometimes referred to as "(D-2)").
(D-3) Kaolin clay having an average primary particle diameter of 0.2 μm surface-treated with a vinylsilane compound (trade name: Polycap CS©, manufactured by J.M. Huber Corporation, USA) (hereinafter, sometimes referred to as "(D-3)").
(D-4) Kaolin clay having an average primary particle diameter of 0.2 μm surface-treated with an aminosilane compound (trade name: Nulok 390®, manufactured by J.M. Huber Corporation, USA) (hereinafter, sometimes referred to as "(D-4)").

<Other Materials>

(TPP) Aromatic phosphate ester-based flame retardant (manufactured by Daihachi Chemical Industry Co., Ltd., trade name: TPP®; 10-mass % reduction temperature: 226° C.).
(CR733S) Aromatic condensed phosphate ester-based flame retardant (manufactured by Daihachi Chemical Industry Co., Ltd., trade name: CR-733S®; 10-mass % reduction temperature: 323° C.).
(TAFMER) Ethylene-propylene copolymer (manufactured by Mitsui Chemicals Inc., trade name: TAFMER P0680J®).
(PS) High Impact Polystyrene (manufactured by PS Japan Co., Ltd., trade name: Polystyrene H9302©).

Comparative Example 1

A resin composition was obtained by feeding 60 parts by mass of (A-1), 4 parts by mass of (B-3), and 20 parts by mass of (D-2) from the most upstream portion (top feed) of a ZSK40 MC twin screw extruder, manufactured by Werner & Pfleiderer, Germany, number of barrels: 13, screw diameter: 40 mm (having the screw pattern with 2 kneading discs L, 6 kneading discs R, and 4 kneading discs N), adding 16 parts by mass in (C-1) from a barrel 5 at a midstream using a liquid addition nozzle, and carrying out melt-kneading at a cylinder temperature of 300° C., a screw rotation number of 450 rpm, and an extrusion rate of 150 kg/h. The test results of physical properties of the resin composition are summarized in Table 1-1.

Comparative Example 2

A resin composition was obtained by carrying out melt-kneading under the same conditions as those in Comparative Example 1, except that 16 parts by mass in (C-1) was replaced with 16 parts by mass of (TPP) which was fed from the most upstream portion (top feed). The test results of physical properties of the resin composition are summarized in Table 1-1.

Comparative Example 3

(C-1) A resin composition was obtained by carrying out melt-kneading under the same conditions as those in Comparative Example 1, except that 16 parts by mass in (C-1) was replaced with 16 parts by mass of (CR733S) which was fed from the barrel 5 using the liquid addition nozzle. The test results of physical properties of the resin composition are summarized in Table 1-1.

Example 1

A resin composition was obtained by carrying out melt-kneading under the same conditions as those in Comparative Example 1, except that 0.5 parts by mass of 16 parts by mass in (C-1) was replaced with (C-2-1) which was fed from the most upstream portion (top feed). The test results of physical properties of the resin composition are summarized in Table 1-1.

Example 2

A resin composition was obtained by carrying out melt-kneading under the same conditions as those in Comparative Example 1, except that 0.7 parts by mass of 16 parts by mass in (C-1) was replaced with (C-2-1) which was fed from the most upstream portion (top feed). The test results of physical properties of the resin composition are summarized in Table 1-1.

Example 3

A resin composition was obtained by carrying out melt-kneading under the same conditions as those in Comparative Example 1, except that 1 part by mass of 16 parts by mass in (C-1) was replaced with (C-2-1) which was fed from the most upstream portion (top feed). The test results of physical properties of the resin composition are summarized in Table 1-1.

Example 4

A resin composition was obtained by carrying out melt-kneading under the same conditions as those in Comparative Example 1, except that 2 parts by mass of 16 parts by mass in (C-1) was replaced with (C-2-1) which was fed from the most upstream portion (top feed). The test results of physical properties of the resin composition are summarized in Table 1-1.

Example 5

A resin composition was obtained by carrying out melt-kneading under the same conditions as those in Comparative Example 1, except that 4 parts by mass of 16 parts by mass in (C-1) was replaced with (C-2-1) which was fed from the most upstream portion (top feed). The test results of physical properties of the resin composition are summarized in Table 1-1.

Example 6

A resin composition was obtained by carrying out melt-kneading under the same conditions as those in Comparative Example 1, except that 8 parts by mass of 16 parts by mass in (C-1) was replaced with (C-2-1) which was fed from the most upstream portion (top feed). The test results of physical properties of the resin composition are summarized in Table 1-1.

Example 7

A resin composition was obtained by carrying out melt-kneading under the same conditions as those in Comparative Example 1, except that 12 parts by mass of 16 parts by mass in (C-1) was replaced with (C-2-1) which was fed from the most upstream portion (top feed). The test results of physical properties of the resin composition are summarized in Table 1-1.

Example 8

A resin composition was obtained by carrying out melt-kneading under the same conditions as those in Comparative Example 1, except that all of 16 parts by mass in (C-1) was replaced with 16 parts by mass of (C-2-1) which was fed from the most upstream portion (top feed). The test results of physical properties of the resin composition are summarized in Table 1-1.

Example 9

A resin composition was obtained by carrying out melt-kneading under the same conditions as those in Example 5, except that (B-3) in Example 5 was replaced with (B-1) and (D-2) was replaced with (D-1). The test results of physical properties of the resin composition are summarized in Table 1-1.

Example 10

A resin composition was obtained by carrying out melt-kneading under the same conditions as those in Example 5, except that (D-2) in Example 5 was replaced with (D-1). The test results of physical properties of the resin composition are summarized in Table 1-1.

Example 11

A resin composition was obtained by carrying out melt-kneading under the same conditions as those in Example 9, except that (B-1) in Example 9 was replaced with (B-3). The test results of physical properties of the resin composition are summarized in Table 1-1.

Example 12

A resin composition was obtained by carrying out melt-kneading under the same conditions as those in Example 5, except that (B-3) in Example 5 was replaced with (B-2) and (D-2) was replaced with (D-1). The test results of physical properties of the resin composition are summarized in Table 1-1.

Example 13

A resin composition was obtained by carrying out melt-kneading under the same conditions as those in Example 5, except that (D-2) in Example 5 was replaced with (D-4). The test results of physical properties of the resin composition are summarized in Table 1-1.

Example 14

A resin composition was obtained by feeding 70 parts by mass of (A-1), 4 parts by mass of (C-2-1), 4 parts by mass of (B-3), and 15 parts by mass of (D-2) from the most upstream portion (top feed) of the ZSK40 MC twin screw extruder, manufactured by Werner & Pfleiderer, Germany, number of barrels: 13, screw diameter: 40 mm (having the screw pattern with 2 kneading discs L, 6 kneading discs R, and 4 kneading discs N), adding 7 parts by mass in (C-1) from the barrel 5 at a midstream using the liquid addition nozzle, and carrying out melt-kneading at a cylinder temperature of 300° C., a screw rotation number of 450 rpm, and an extrusion rate of 150 kg/h. The test results of physical properties of the resin composition are summarized in Table 1-2.

Example 15

A resin composition was obtained by feeding 80 parts by mass of (A-1), 2 parts by mass of (C-2-1), 2 parts by mass of (B-3), and 11 parts by mass of (D-2) from the most upstream portion (top feed) of the ZSK40 MC twin screw extruder, manufactured by Werner & Pfleiderer, Germany, number of barrels: 13, screw diameter: 40 mm (having the screw pattern with 2 kneading discs L, 6 kneading discs R, and 4 kneading discs N), adding 5 parts by mass in (C-1) from the barrel 5 at a midstream using the liquid addition nozzle, and carrying out melt-kneading at a cylinder temperature of 300° C., a screw rotation number of 450 rpm, and an extrusion rate of 150 kg/h. The test results of physical properties of the resin composition are summarized in Table 1-2.

Comparative Example 4

A resin composition was obtained by feeding 85 parts by mass of (A-1), 2 parts by mass of (C-1), 1 part by mass of (C-2-1), 1 part by mass of (B-3), and 11 parts by mass of (D-2) from the most upstream portion (top feed) of the ZSK40 MC twin screw extruder, manufactured by Werner & Pfleiderer, Germany, number of barrels: 13, screw diameter: 40 mm (having the screw pattern with 2 kneading discs L, 6 kneading discs R, and 4 kneading discs N), and carrying out melt-kneading at a cylinder temperature of 300° C., a screw rotation number of 450 rpm, and an extrusion rate of 150 kg/h. The test results of physical properties of the resin composition are summarized in Table 1-2.

Example 16

A resin composition was obtained by feeding 40 parts by mass of (A-1), 3 parts by mass of (C-2-1), 10 parts by mass of (B-3), and 25 parts by mass of (D-2) from the most upstream portion (top feed) of the ZSK40 MC twin screw extruder, manufactured by Werner & Pfleiderer, Germany, number of barrels: 13, screw diameter: 40 mm (having the screw pattern with 2 kneading discs L, 6 kneading discs R, and 4 kneading discs N), adding 22 parts by mass in (C-1) from the barrel 5 at a midstream using the liquid addition nozzle, and carrying out melt-kneading at a cylinder temperature of 300° C., a screw rotation number of 450 rpm, and an extrusion rate of 150 kg/h. The test results of physical properties of the resin composition are summarized in Table 1-2.

Example 17

A resin composition was obtained by feeding 25 parts by mass of (A-1), 4 parts by mass of (C-2-1), 20 parts by mass of (B-3), and 30 parts by mass of (D-2) from the most upstream portion (top feed) of the ZSK40 MC twin screw extruder, manufactured by Werner & Pfleiderer, Germany, number of barrels: 13, screw diameter: 40 mm (having the screw pattern with 2 kneading discs L, 6 kneading discs R, and 4 kneading discs N), adding 21 parts by mass in (C-1) from the barrel 5 at a midstream using the liquid addition nozzle, and carrying out melt-kneading at a cylinder temperature of 300° C., a screw rotation number of 450 rpm, and an extrusion rate of 150 kg/h. The test results of physical properties of the resin composition are summarized in Table 1-2.

Comparative Example 5

A resin composition was obtained by feeding 20 parts by mass of (A-1), 6 parts by mass of (C-2-1), 20 parts by mass of (B-3), and 30 parts by mass of (D-2) from the most upstream portion (top feed) of the ZSK40 MC twin screw extruder, manufactured by Werner & Pfleiderer, Germany, number of barrels: 13, screw diameter: 40 mm (having the screw pattern with 2 kneading discs L, 6 kneading discs R, and 4 kneading discs N), adding 24 parts by mass in (C-1) from the barrel 5 at a midstream using the liquid addition nozzle, and carrying out melt-kneading at a cylinder temperature of 300° C., a screw rotation number of 450 rpm, and an extrusion rate of 150 kg/h. The test results of physical properties of the resin composition are summarized in Table 1-2.

Note that the DTUL was not measured intentionally because the measured values were expected to be extremely low.

Example 18

A resin composition was obtained by feeding 57 parts by mass of (A-1), 4 parts by mass of (C-2-1), 4 parts by mass of (B-3), 17 parts by mass of (D-2), and 5 parts by mass of (TAFMER) from the most upstream portion (top feed) of the ZSK40 MC twin screw extruder, manufactured by Werner & Pfleiderer, Germany, number of barrels: 13, screw diameter: 40 mm (having the screw pattern with 2 kneading discs L, 6 kneading discs R, and 4 kneading discs N), adding 13 parts by mass in (C-1) from the barrel 5 at a midstream using the liquid addition nozzle, and carrying out melt-kneading at a cylinder temperature of 300° C., a screw rotation number of 450 rpm, and an extrusion rate of 150 kg/h. The test results of physical properties of the resin composition are summarized in Table 1-2.

Example 19

A resin composition was obtained by carrying out melt-kneading under the same conditions as those in Example 18, except that 5 parts by mass of (TAFMER) in Example 18 was replaced with 5 parts by mass of (PS). The test results of physical properties of the resin composition are summarized in Table 1-2.

Example 20

A resin composition was obtained by carrying out melt-kneading under the same conditions as those in Example 18, except that 5 mass parts of (TAFMER) in Example 18 was not used and the amount of (B-3) was set to 9 parts by mass. The test results of physical properties of the resin composition are summarized in Table 1-2.

Example 21

A resin composition was obtained by carrying out melt-kneading under the same conditions as those in Example 5, except that 4 parts by mass of (C-2-1) in Example 5 was replaced with (C-2-2). The test results of physical properties of the resin composition are summarized in Table 1-2.

Example 22

A resin composition was obtained by carrying out melt-kneading under the same conditions as those in Example 5, except that 4 parts by mass of (C-2-1) in Example 5 was replaced with (C-2-3). The test results of physical properties of the resin composition are summarized in Table 1-2.

TABLE 1-1

| | | | Comp. Ex. 1 | Comp. Ex. 2 | Comp. Ex. 3 | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|---|---|---|---|
| Composition | PPE (A-1) | mass % | 60 | 60 | 60 | 60 | 60 | 60 | 60 | 60 | 60 | 60 | 60 | 60 | 60 | 60 | 60 | 60 |
| | SEBS (B-1) | mass % | | | | | | | | | | | | 4 | | 4 | | |
| | SEBS (B-2) | mass % | | | | | | | | | | | | | | | 4 | |
| | SEBS (B-3) | mass % | 4 | 4 | 4 | 4 | 4 | 4 | 4 | 4 | 4 | 4 | 4 | | 4 | | | 4 |
| | CR741 (C-1) | mass % | 16 | | | 15.5 | 15.3 | 15 | 14 | 12 | 8 | 4 | | 12 | 12 | 12 | 12 | 12 |
| | PX-200 (C-2-1) | mass % | | | | 0.5 | 0.7 | 1 | 2 | 4 | 8 | 12 | 16 | 4 | 4 | 4 | 4 | 4 |
| | TPP | mass % | | 16 | | | | | | | | | | | | | | |
| | CR733S | mass % | | | 16 | | | | | | | | | | | | | |
| | Kaolin Clay (D-1) | mass % | | | | | | | | | | | | 20 | 20 | | | |
| | Kaolin Clay (D-2) | mass % | 20 | 20 | 20 | 20 | 20 | 20 | 20 | 20 | 20 | 20 | 20 | | | 20 | | |
| | Kaolin Clay (D-3) | mass % | | | | | | | | | | | | | | | 20 | |
| | Kaolin Clay (D-4) | mass % | | | | | | | | | | | | | | | | 20 |
| | TAFMER | mass % | | | | | | | | | | | | | | | | |
| | PS | mass % | | | | | | | | | | | | | | | | |
| | Total | mass % | 100 | 100 | 100 | 100 | 100 | 100 | 100 | 100 | 100 | 100 | 100 | 100 | 100 | 100 | 100 | 100 |
| Physical properties | DTUL | °C. | 133 | 114 | 132 | 133 | 133 | 134 | 134 | 134 | 134 | 134 | 134 | 132 | 132 | 132 | 134 | 134 |
| | Charpy impact strength | kJ/m² | 5.4 | 7.8 | 3.8 | 5.5 | 5.5 | 5.8 | 6.4 | 6.8 | 6.9 | 7.2 | 7.4 | 4.8 | 4.8 | 4.3 | 6.5 | 7.2 |
| | Tensile strength | MPa | 72 | 64 | 75 | 72 | 72 | 72 | 72 | 72 | 72 | 72 | 72 | 70 | 71 | 67 | 72 | 72 |
| | Tensile elongation | % | 17.2 | 24.4 | 8.6 | 17.7 | 22.5 | 25.8 | 33.1 | 35.5 | 28.4 | 26.9 | 23.3 | 13.8 | 14.4 | 12.7 | 33.2 | 35.4 |
| | Flexural strength | MPa | 120 | 101 | 122 | 120 | 120 | 122 | 122 | 125 | 125 | 122 | 120 | 119 | 119 | 119 | 125 | 125 |
| | Flexural modulus | MPa | 4027 | 3240 | 4120 | 4022 | 4025 | 4040 | 4064 | 4120 | 4230 | 4087 | 4035 | 4040 | 4055 | 4004 | 4180 | 4210 |
| | Appearance of molded article | — | A | D | D | A | A | A | A | A | B | B | B | A | A | A | A | A |
| | Mold MD evaluation | — | B | D | B | B | A | A | A | A | A | B | B | A | A | A | A | A |
| | Minimum burning time | seconds | 7 | 3 | 3 | 4 | 3 | 3 | 2 | 2 | 2 | 1 | 1 | 2 | 2 | 2 | 2 | 2 |
| | Maximum burning time | seconds | 36 | 7 | 12 | 9 | 8 | 7 | 7 | 6 | 5 | 5 | 4 | 6 | 6 | 5 | 7 | 5 |
| | Difference of minimum burning time and maximum burning time | seconds | 29 | 4 | 9 | 5 | 6 | 4 | 5 | 4 | 3 | 4 | 3 | 4 | 4 | 3 | 5 | 3 |
| | Flame retardancy level | — | NG | V-0 | V-1 | V-0 | V-0 | V-0 | V-0 | V-0 | V-0 | V-0 | V-0 | V-0 | V-0 | V-0 | V-0 | V-0 |

TABLE 1-2

|  |  |  | Example 14 | Example 15 | Comp. Ex. 4 | Example 16 | Example 17 | Comp. Ex. 5 | Example 18 | Example 19 | Example 20 | Example 21 | Example 22 |
|---|---|---|---|---|---|---|---|---|---|---|---|---|---|
| Composition | PPE (A-1) | mass % | 70 | 80 | 85 | 40 | 25 | 20 | 57 | 57 | 57 | 60 | 60 |
|  | SEBS (B-3) | mass % | 4 | 2 | 1 | 10 | 20 | 20 | 4 | 4 | 9 | 4 | 4 |
|  | CR741 (C-1) | mass % | 7 | 5 | 2 | 22 | 21 | 24 | 13 | 13 | 13 | 12 | 12 |
|  | PX-200 (C-2-1) | mass % | 4 | 2 | 1 | 3 | 4 | 6 | 4 | 4 | 4 |  |  |
|  | Rabitol FP-110 (C-2-2) | mass % |  |  |  |  |  |  |  |  |  | 4 |  |
|  | HCA-HQ (C-2-3) | mass % |  |  |  |  |  |  |  |  |  |  | 4 |
|  | Kaolin Clay (D-2) | mass % | 15 | 11 | 11 | 25 | 30 | 30 | 17 | 17 | 17 | 20 | 20 |
|  | TAFMER | mass % |  |  |  |  |  |  | 5 |  |  |  |  |
|  | PS | mass % |  |  |  |  |  |  |  | 5 |  |  |  |
|  | Total | mass % | 100 | 100 | 100 | 100 | 100 | 100 | 100 | 100 | 100 | 100 | 100 |
| Physical properties | DTUL | °C. | 145 | 154 | 161 | 103 | 74 | - | 125 | 127 | 126 | 132 | 130 |
|  | Charpy impact strength | kJ/m² | 5.4 | 3.8 | 1.4 | 14.3 | 23.1 | 23.8 | 12.3 | 2.3 | 14.8 | 4.6 | 5.8 |
|  | Tensile strength | MPa | 70 | 70 | 62 | 69 | 66 | 56 | 74 | 75 | 77 | 71 | 70 |
|  | Tensile elongation | % | 26.2 | 20.1 | 2.4 | 33.2 | 18.6 | 18.4 | 20.6 | 4.6 | 37.2 | 20.1 | 16.3 |
|  | Flexural strength | MPa | 112 | 107 | 98 | 92 | 85 | 74 | 122 | 120 | 124 | 120 | 116 |
|  | Flexural modulus | MPa | 3674 | 3210 | 2830 | 2710 | 2540 | 2130 | 3840 | 4120 | 3730 | 4330 | 4000 |
|  | Appearance of molded article | — | A | A | D | A | B | D | A | B | A | B | B |
|  | Mold MD evaluation | — | A | A | B | A | B | D | A | A | A | A | B |
|  | Minimum burning time | seconds | 2 | 1 | 6 | 2 | 3 | 5 | 3 | 3 | 1 | 4 | 3 |
|  | Maximum burning time | seconds | 4 | 4 | 28 | 6 | 9 | 13 | 9 | 8 | 4 | 9 | 6 |
|  | Difference of minimum burning time and maximum burning time | seconds | 2 | 3 | 22 | 4 | 6 | 8 | 6 | 5 | 3 | 5 | 3 |
|  | Flame retardancy level | — | V-0 | V-0 | V-1 | V-0 | V-0 | V-1 | V-0 | V-0 | V-0 | V-0 | V-0 |

Table 1 indicates that the flame retardancy of the resin composition of Comparative Example 1 was insufficient because the component (C-1) of the present application was only used as the flame retardant.

In the resin compositions of Comparative Example 2 and Comparative Example 3, because the types of flame retardant were different from the (C) component of the present application, the appearance of the thin molded article and the MD adhesion prevention characteristic of the resin composition of Comparative Example 2 were insufficient and the appearance of the thin molded article and the flame retardancy of the resin composition of Comparative Example 3 were insufficient.

In the resin compositions of Examples 1 to 22, because the blending amounts of the components (A), (B), (C) and (D) were all within the ranges specified in the present application, the flame retardancy, the appearance of the thin molded article, the MD adhesion prevention characteristic, and other physical properties were excellent. In particular, the resin compositions of Examples 2 to 5, 9 to 16, 18, and 20 tended to have good balance among the flame retardancy, the thin molded article appearance, MD adhesion prevention characteristic, and other physical properties.

Further, in Examples 1 to 8, silver that tended to occur during molding of thin molded articles was not observed in Examples 2 to 5, and adhesion of MD to the mold (mold deposit) was not observed after 300 shots of continuous molding. Stated differently, combinations of (C-1) and (C-2-1) in the specified ratios tended to improve the appearance of the thin molded articles and the characteristic to prevent adhesion of MD to the mold. Although the mechanism is not established, it is presumed that, when (C-1) and (C-2-1) are present in a specific ratio in the composition, the (C-1) component absorbs decomposed gaseous components derived from the component (C-2-1) causing silver during molding of thin molded articles, thereby reducing silver. With regard to the improvement in the MD adhesion prevention characteristic, it is presumed that the MD components become more likely to adhere to the surface of molded articles, rather than the surface of the mold, thereby preventing deposition of MD to the mold.

In Comparative Example 4, because the amount of the (A) component was out of the range of the upper limit of the present application and the amount of the (C) component was out of the range of the lower limit of the present application, the appearance of the thin molded article and the flame retardancy were insufficient.

In Comparative Example 5, because the amount of the (A) component was out of the range of the lower limit specified in the present application and the amount of the (C) component was out of the range of the upper limit specified in the present application, the appearance of the thin molded article and the MD adhesion prevention characteristic were insufficient and the flame retardancy was also insufficient.

INDUSTRIAL APPLICABILITY

The polyphenylene ether-based resin composition of the present disclosure can be effectively used in a use environment in which a favorable performance balance between the rigidity and the tenacity is required, has a good mold appearance, is excellent in flame retardancy, particularly flame retardancy in thin molded pieces, and is extremely low in occurrence of MD to molds and gases when being molded into thin articles. Therefore, it can be effectively used for production of a molded article such as a cover part of a fire detector.

The invention claimed is:

1. A polyphenylene ether-based resin composition comprising:
a polyphenylene ether (A);
a styrene-based thermoplastic elastomer (B);
a flame retardant (C); and
a kaolin clay (D),
wherein, when a total content of the (A), (B), (C), and (D) components is taken as 100 mass %, a content of the (A) component is 25 to 84 mass %, a content of the (B) component is 1 to 20 mass %, a content of the (C)

component is 4 to 25 mass %, and a content of the (D) component is 11 to 30 mass %, and the (C) component containsan organophosphorus flame retardant (C-1) having a 10-mass % reduction temperature in a range of 380 to 430° C. as measured by the following measurement method, and an organophosphorus flame retardant (C-2) having a 10-mass % reduction temperature in a range of 330 to 360° C. as measured by the following measurement method:

<Measurement method of the 10-mass % reduction temperature of the (C-1) and (C-2) components> a 10-mass % reduction temperature is determined from a heating loss curve obtained by weighing out about 10 mg of the (C-1) component or (C-2) component, which is heated from 30° C. to 800° C. at a temperature rise rate of 10° C./min under a nitrogen atmosphere in a TGA measurement apparatus, wherein the (C) component is a mixture of the (C-1) component and the (C-2) component, and contains 50 to 95 mass % of the (C-1) component and 50 to 5 mass % of the (C-2) component per 100 mass % of the (C) component.

2. The polyphenylene ether-based resin composition according to claim 1, wherein the (C-1) component is Bisphenol A bisdiphenyl phosphate, and the (C-2) component is a condensation type phosphate ester-based flame retardant represented by the following chemical formula (1):

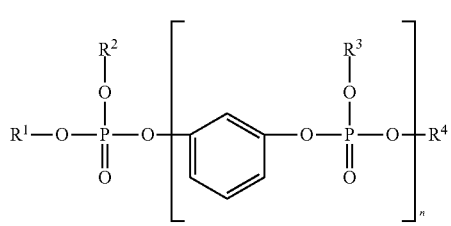

(1)

(in the formula, R1 to R4 are 2,6-xylyl groups, and n is 1 to 3).

3. The polyphenylene ether-based resin composition according to claim 1, wherein the sum of the contents of the (A), (B), (C), and (D) components accounts for 90 mass % or more of the entire polyphenylene ether-based resin composition.

4. The polyphenylene ether-based resin composition according to claim 1, wherein the (B) component comprises a styrene-based thermoplastic elastomer modified with an amino compound or a carbonyl compound.

5. The polyphenylene ether-based resin composition according to claim 1, wherein the (D) component comprises a kaolin clay surface-treated with a silane compound.

6. The polyphenylene ether-based resin composition according to claim 1, wherein a sum of contents of a polyolefin-based resin and a styrene-based resin per 100 mass % of the polyphenylene ether-based resin composition is 5 mass % or less.

7. The polyphenylene ether-based resin composition according to claim 1, wherein a content of an inorganic filler other than the (D) component per 100 mass % of the polyphenylene ether-based resin composition is 3 mass % or less.

8. The polyphenylene ether-based resin composition according to claim 1, wherein a flame retardant level when a combustion test is performed in accordance with UL94 on a test specimen having a thickness of 1.5 mm is V-0.

9. A molded article comprising a portion having a thickness of 1.5 mm or less and comprising the polyphenylene ether-based resin composition according to claim 1.

10. The polyphenylene ether-based resin composition according to claim 1, wherein the sum of the contents of the (A), (B), (C), and (D) components accounts for 95 mass % or more of the entire polyphenylene ether-based resin composition.

11. The polyphenylene ether-based resin composition according to claim 1, wherein a sum of contents of a polyolefin-based resin and a styrene-based resin per 100 mass % of the polyphenylene ether-based resin composition is 5 mass % or less, and wherein a content of an inorganic filler other than the (D) component per 100 mass % of the polyphenylene ether-based resin composition is 3 mass % or less.

12. A molded article comprising a portion having a thickness of 1.5 mm or less and comprising the polyphenylene ether-based resin composition according to claim 2.

13. A molded article comprising a portion having a thickness of 1.5 mm or less and comprising the polyphenylene ether-based resin composition according to claim 3.

14. A molded article comprising a portion having a thickness of 1.5 mm or less and comprising the polyphenylene ether-based resin composition according to claim 11.

15. A molded article comprising a portion having a thickness of 1.5 mm or less and comprising the polyphenylene ether-based resin composition according to claim 2, wherein a sum of contents of a polyolefin-based resin and a styrene-based resin per 100 mass % of the polyphenylene ether-based resin composition is 5 mass % or less, wherein a content of an inorganic filler other than the (D) component per 100 mass % of the polyphenylene ether-based resin composition is 3 mass % or less, and wherein the sum of the contents of the (A), (B), (C), and (D) components accounts for 95 mass % or more of the entire polyphenylene ether-based resin composition.

* * * * *